United States Patent
Lim

(10) Patent No.: US 10,618,503 B2
(45) Date of Patent: Apr. 14, 2020

(54) APPARATUS FOR CONTROLLING BRAKING FORCE OF PLATOONING VEHICLE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Jong Su Lim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 38 days.

(21) Appl. No.: 15/927,621

(22) Filed: Mar. 21, 2018

(65) Prior Publication Data

US 2019/0176783 A1   Jun. 13, 2019

(30) Foreign Application Priority Data

Dec. 12, 2017   (KR) .................. 10-2017-0170423

(51) Int. Cl.
*B60T 7/12* (2006.01)
*B60T 8/18* (2006.01)
(Continued)

(52) U.S. Cl.
CPC ............... *B60T 7/12* (2013.01); *B60T 8/172* (2013.01); *B60T 8/18* (2013.01); *B60T 8/32* (2013.01);
(Continued)

(58) Field of Classification Search
CPC .. B60T 2201/022; B60T 8/32; B60T 2201/08; B60T 13/662; B60T 8/885;
(Continued)

(56) References Cited

U.S. PATENT DOCUMENTS 4,079,802 A * 3/1978 Kawata .............. B60K 31/0008
                                                 180/169
6,032,097 A * 2/2000 Iihoshi ................ G05D 1/0293
                                                  701/96
(Continued)

FOREIGN PATENT DOCUMENTS

JP       10-293899 A    11/1998
JP     2006-256479 A     9/2006
KR  10-2017-0118490 A   10/2017

*Primary Examiner* — Angelina Shudy
*Assistant Examiner* — Mohamed Abdo Algehaim
(74) *Attorney, Agent, or Firm* — Mintz Levin Cohn Ferris Glovsky and Popeo, P.C.; Peter F. Corless

(57) ABSTRACT

The present disclosure relates to an apparatus for controlling a braking force of a platooning vehicle. The apparatus includes a braking distance predicting unit configured to predict a predicted braking distance of a host vehicle, a braking restriction determining unit configured to determine whether a braking distance of the host vehicle is to be restricted, by comparing the predicted braking distance of the host vehicle with predicted braking distances of following vehicles. The apparatus further includes a braking restriction degree determining unit configured to determine a braking restriction degree of the braking distance of the host vehicle in the case in which it is necessary to restrict the braking distance of the host vehicle.

17 Claims, 9 Drawing Sheets

(51) Int. Cl.
*G08G 1/16* (2006.01)
*B60T 8/32* (2006.01)
*B60T 8/172* (2006.01)
*G05D 1/02* (2020.01)
*B60T 7/22* (2006.01)

(52) U.S. Cl.
CPC ......... *G05D 1/0293* (2013.01); *G08G 1/166* (2013.01); *B60T 8/323* (2013.01); *B60T 2201/022* (2013.01); *G05D 2201/0213* (2013.01)

(58) Field of Classification Search
CPC ... B60T 8/17; B60T 8/171; B60T 8/00; B60T 13/74; B60T 2201/02; B60T 8/17551; B60T 8/17558; B60T 2210/12; B60T 2201/024; B60T 8/18; B60T 15/46; B60T 7/12; B60T 8/172; B60T 8/30; B60T 8/58; G05D 1/0293; G05D 2201/0213; G05D 1/0295; G05D 1/0027; G05D 1/0287; G05D 1/0217; G05D 1/0291; G05D 1/0272; G05D 1/0289; G08G 1/166; G08G 1/096725; G08G 1/161; G08G 1/096716; G08G 1/22; G08G 1/096791; G08G 1/096741; G08G 1/162; G08G 1/20; G08G 1/096708; B60W 10/18; B60W 30/16; B60W 2550/308; B60W 2520/10; B60W 30/09; B60W 30/14; B60W 30/143; B60W 30/17; B60W 30/146; B60W 30/162; B60W 30/08; B60W 50/0097; B60W 20/15; B60W 30/18109; B60W 2550/30; B60W 30/095; B60W 2550/306; B60W 2530/10; B60W 30/165; B60W 2750/308; B60W 2050/0022; B60W 30/0953
USPC ..... 701/70, 1, 93, 96, 301, 74, 83, 32.5, 38, 701/94
See application file for complete search history.

(56) References Cited

U.S. PATENT DOCUMENTS

| | | | | |
|---|---|---|---|---|
| 6,397,149 | B1* | 5/2002 | Hashimoto | G05D 1/0297 455/99 |
| 8,352,111 | B2* | 1/2013 | Mudalige | G08G 1/22 340/435 |
| 8,527,172 | B2* | 9/2013 | Moshchuk | B60W 10/184 701/48 |
| 9,092,986 | B2* | 7/2015 | Salomonsson | G08G 1/167 |
| 9,539,989 | B2* | 1/2017 | Yamashiro | B60T 7/22 |
| 9,632,507 | B1* | 4/2017 | Korn | G05D 1/0293 |
| 2004/0122578 | A1* | 6/2004 | Isaji | B60T 7/12 701/70 |
| 2012/0083983 | A1* | 4/2012 | Danz | B60T 7/12 701/70 |
| 2012/0119894 | A1* | 5/2012 | Pandy | B60W 30/16 340/435 |
| 2012/0293314 | A1* | 11/2012 | Chatterjee | B60Q 9/008 340/436 |
| 2013/0041567 | A1* | 2/2013 | Yamashiro | B60T 7/22 701/96 |
| 2013/0211624 | A1* | 8/2013 | Lind | G05D 1/0278 701/2 |
| 2014/0067220 | A1* | 3/2014 | Seiler | B60T 7/12 701/70 |
| 2016/0133131 | A1* | 5/2016 | Grimm | B60W 40/068 701/117 |
| 2016/0185325 | A1* | 6/2016 | Ike | B60T 7/22 701/70 |
| 2017/0106840 | A1* | 4/2017 | Kozuka | B60T 7/12 |
| 2017/0287233 | A1* | 10/2017 | Nix | G07C 5/008 |
| 2017/0344023 | A1* | 11/2017 | Laubinger | G05D 1/0272 |
| 2017/0364070 | A1* | 12/2017 | Oba | B60W 50/08 |
| 2018/0137763 | A1* | 5/2018 | Derag Rden | G05D 1/0295 |
| 2018/0188745 | A1* | 7/2018 | Pilkington | G05D 1/0295 |
| 2018/0210461 | A1* | 7/2018 | Cremona | G05D 1/0293 |
| 2018/0345969 | A1* | 12/2018 | Yasui | G08G 1/096822 |
| 2018/0348791 | A1* | 12/2018 | Hendrickson | G05D 1/0027 |

* cited by examiner

APPARATUS FOR CONTROLLING BRAKING FORCE OF PLATOONING VEHICLE, SYSTEM INCLUDING THE SAME, AND METHOD THEREOF

CROSS-REFERENCE TO RELATED APPLICATION

This application is based on and claims the benefit of priority to Korean Patent Application No. 10-2017-0170423, filed on Dec. 12, 2017, in the Korean Intellectual Property Office, the disclosure of which is incorporated herein in its entirety by reference.

TECHNICAL FIELD

The present disclosure relates to an apparatus for controlling a braking force of a platooning vehicle, a system including the same, and a method thereof, and more particularly, to a technology of considering braking forces of all platooning vehicles to restrict a braking force of a vehicle.

BACKGROUND

Platooning refers to a case in which a following vehicle travels while following a leading vehicle, and the platooning vehicles transmit and receive various travel information through vehicle-to-vehicle (V2V) communication to control the speeds of the vehicles and the inter-vehicle intervals between the vehicles, allowing the vehicles to travel while maintaining a specific interval.

The disclosure of this section is to provide background of the invention. Applicant notes that this section may contain information available before this application. However, by providing this section, Applicant does not admit that any information contained in this section constitutes prior art.

SUMMARY

The present disclosure is conceived to solve the above-described problems of the related art, and the present disclosure provides an apparatus for controlling a braking force of a platooning vehicle, by which collision of platooning vehicles may be prevented by restricting the braking forces of the vehicles in consideration of the predicted braking distances of all the vehicles, a system including the same, and a method thereof.

The technical objects of the present disclosure are not limited to the above-mentioned one, and the other unmentioned technical objects will become apparent to those skilled in the art from the following description.

In accordance with an aspect of the present disclosure, there is provided an apparatus for controlling a braking force of a platooning vehicle, the apparatus including a braking distance predicting unit configured to predict a predicted braking distance of a host vehicle, a braking restriction determining unit configured to determine whether a braking distance of the host vehicle is to be restricted, by comparing the predicted braking distance of the host vehicle with predicted braking distances of following vehicles, and a braking restriction degree determining unit configured to determine a braking restriction degree of the braking distance of the host vehicle in the case in which it is necessary to restrict the braking distance of the host vehicle.

The braking distance predicting unit may calculate the predicted braking distance by using a speed, a frictional coefficient, a gravitational acceleration, a weight, and a measured total braking force of the vehicle during braking of the vehicle.

The braking restriction determining unit may compare the predicted braking distance of the host vehicle with a maximum value of the predicted braking distances of the following vehicles.

The braking restriction determining unit may determine a location of the host vehicle in a platoon, and may compare the maximum value of the predicted braking distances of the following vehicles with the predicted braking distance of the host vehicle with reference to the determined location of the host vehicle.

The braking restriction determining unit may determine whether the braking distance of the following vehicle are larger than the predicted braking distance of the host vehicle, and determines that it is necessary to restrict the braking distance of the host vehicle to a maximum braking distance of the following vehicle in the case in which the braking distance of the following vehicle is larger than the predicted braking distance of the host vehicle.

The braking restriction determining unit may determine that the braking distance of the host vehicle is to be maintained in the case in which the braking distance of the following vehicle is smaller than or equal to the predicted braking distance of the host vehicle.

The braking restriction degree determining unit may restrict a braking request degree of the host vehicle to a specific ratio based on a ratio of the maximum value of the predicted braking distances of the following vehicles to the predicted braking distance of the host vehicle.

The braking restriction degree determining unit may determine the braking restriction degree by using a braking distance of the host vehicle, a total braking force of the host vehicle, a weight of the host vehicle, a weight of the following vehicle, and a total braking force of the following vehicle.

The braking restriction degree determining unit may determine the braking restriction degree such that a value obtained by multiplying a braking distance of the host vehicle, a value obtained by dividing a total braking force of the host vehicle by the weight of the host vehicle, and a value obtained by dividing the weight of the following vehicle by a total braking force of the following vehicle is equal to a predicted braking distance of the following vehicle.

In accordance with another aspect of the present disclosure, there is provided a system for controlling a braking force of a platooning vehicle, the apparatus including a communication unit configured to perform communication between platooning vehicles, a platooning vehicle braking force control apparatus configured to predict a predicted braking distance of a host vehicle in a platoon, determine whether a braking distance of the host vehicle is to be restricted by comparing the predicted braking distance of the host vehicle with predicted braking distances of the host vehicle, and a display configured to display a braking force restriction result of the host vehicle in the platoon.

The display unit may display a ratio of a restricted braking force to an existing braking force.

The platooning vehicle braking force control apparatus may include a braking distance predicting unit configured to predict a predicted braking distance of a host vehicle, a braking restriction determining unit configured to determine whether a braking distance of the host vehicle is to be restricted, by comparing the predicted braking distance of the host vehicle with predicted braking distances of following vehicles, and a braking restriction degree determining unit configured to determine a braking restriction degree of the braking distance of the host vehicle in the case in which it is necessary to restrict the braking distance of the host vehicle.

The braking distance predicting unit may calculate the predicted braking distance by using a speed, a frictional coefficient, a gravitational acceleration, a weight, and a measured total braking force of the vehicle during braking of the vehicle.

The braking restriction determining unit may compare the predicted braking distance of the host vehicle with a maximum value of the predicted braking distances of the following vehicles.

The braking restriction determining unit may determine whether the braking distance of the following vehicle are larger than the predicted braking distance of the host vehicle, and determines that it is necessary to restrict the braking distance of the host vehicle to a maximum braking distance of the following vehicle in the case in which the braking distance of the following vehicle is larger than the predicted braking distance of the host vehicle.

The braking restriction determining unit may determine that the braking distance of the host vehicle is to be maintained in the case in which the braking distance of the following vehicle is smaller than or equal to the predicted braking distance of the host vehicle.

The braking restriction degree determining unit may restrict a braking request degree of the host vehicle to a specific ratio based on a ratio of the maximum value of the predicted braking distances of the following vehicles to the predicted braking distance of the host vehicle.

The braking restriction degree determining unit may determine the braking restriction degree such that a value obtained by multiplying a braking distance of the host vehicle, a value obtained by dividing a total braking force of the host vehicle by the weight of the host vehicle, and a value obtained by dividing the weight of the following vehicle by a total braking force of the following vehicle is equal to a predicted braking distance of the following vehicle.

In accordance with another aspect of the present disclosure, there is provided a method for controlling a braking force of a platooning vehicle, the apparatus including predicting a predicted braking distance of a host vehicle, determining whether a braking distance of the host vehicle is to be restricted, by comparing the predicted braking distance of the host vehicle with a maximum value of predicted braking distances of following vehicles, in the case in which it is necessary to restrict the braking distance of the host vehicle, determining a braking restriction degree of the braking distance, and braking the host vehicle by applying the braking restriction degree.

The method may include displaying a braking force restriction result of the host vehicle in the platoon.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
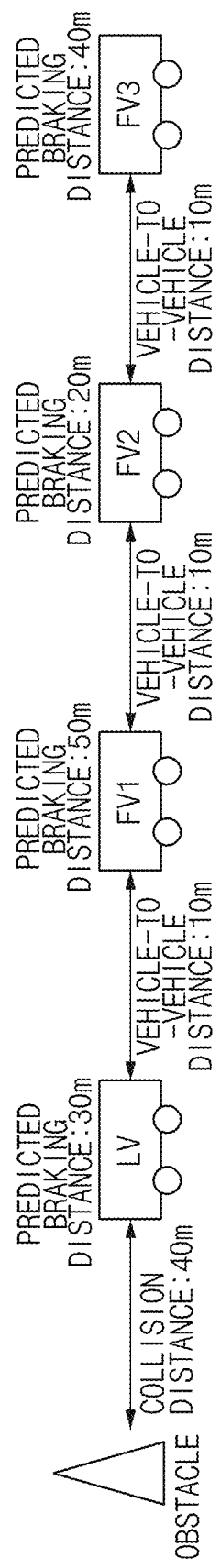
FIG. 1 is an exemplary view of platooning of general vehicles.

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, teams, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific teams, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

If predicted braking distances of the platooning vehicles are different according to the weights, the tire state, and the braking performances of the vehicles, the vehicle, the braking distance of which is longer, may fail to be completely braked and collide with a leading vehicle when it is abruptly braked after an obstacle is abruptly discovered.

Figure 2:
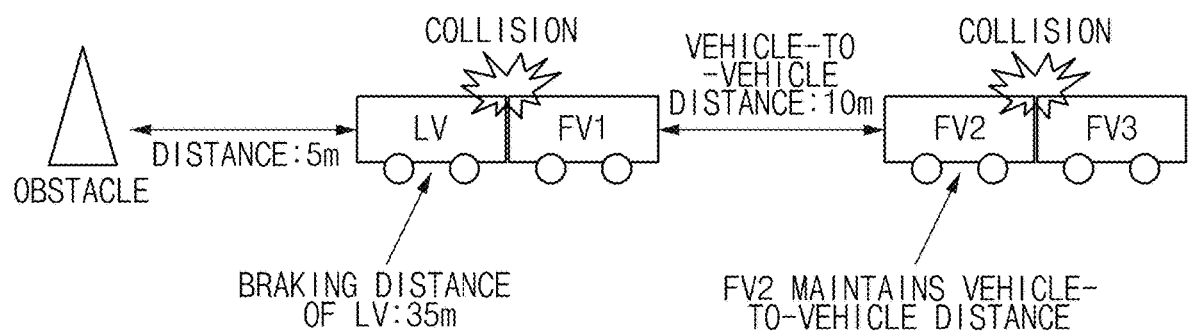
FIG. 2 is a view for explaining a problem when platooning of general vehicles is controlled.

As illustrated in FIG. 1, for example, if the braking distance of a leading vehicle LV is 30 m, the braking distance of a first following vehicle FV1 is 50 m, the braking distance of a second following vehicle FV2 is 20 m, and the braking distance of a third following vehicle FV3 is 40 m when the platooning vehicles travel at an inter-vehicular distance of 10 m as illustrated in FIG. 2, the leading vehicle LV is not fully braked but is braked by about 35 m because a total distance of 45 m, which is a sum of the braking distance of the leading vehicle LV of 35 m and the inter-vehicle distance of 10 m, is marginal when the leading vehicle LV discovers an obstacle on the front side of 5 m and is braked. However, because the predicted braking distance of the first following vehicle FV1 is 50 m, the first following vehicle FV1 finally collides with the leading vehicle LV.

In this way, because the platooning vehicles are controlled collectively without considering the predicted braking distances of the vehicles, the possibility of accidents is high when, for example, a truck that loads a heavy weight platoons.

The present disclosure discloses a configuration that may control a braking force of a platooning vehicle in consideration of braking forces of all the platooning vehicles when the braking of the platooning vehicle is controlled, thereby preventing collision of the vehicles when the platooning vehicles are emergently braked.

Figure 4A:
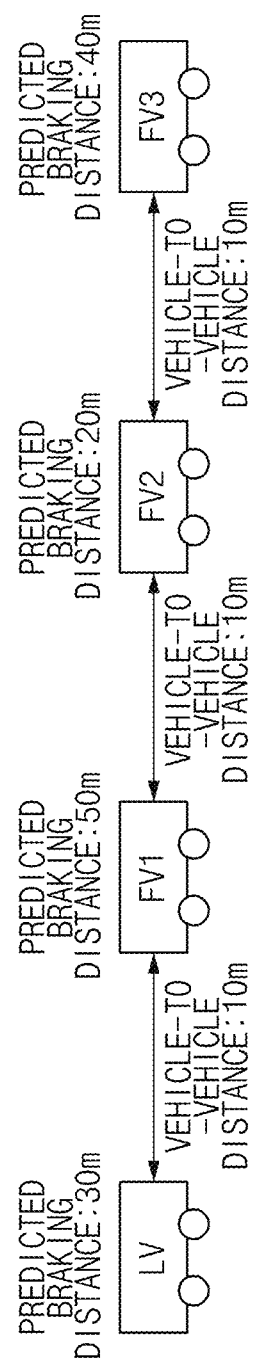
FIG. 4A is an exemplary view of vehicles that platoon while maintaining a specific inter-vehicle distance according to an embodiment of the present disclosure.
Figure 4B:
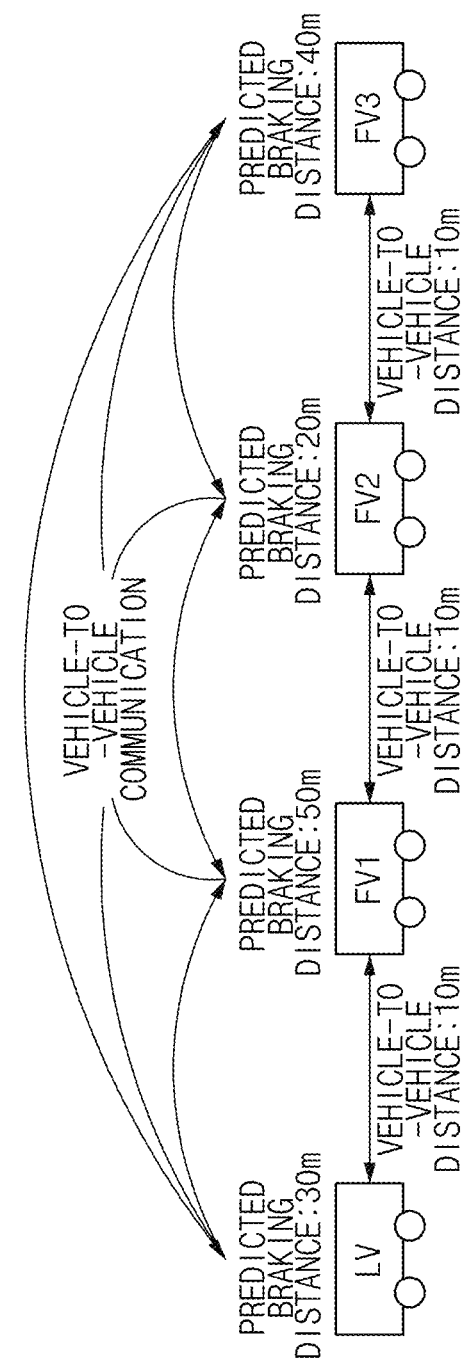
FIG. 4B is an exemplary view of sharing a predicted braking distance of a host vehicle in platooning vehicles according to an embodiment of the present disclosure.

An aspect of the present invention discloses is a method for controlling a fleet of vehicles driving together. At least two vehicles are driving as a group maintaining the same speed on the same lane of the road (FIG. 4A) based on vehicle-to-vehicle communication. Each of the vehicle in the fleet estimates its braking distance to make a stop with its full braking from the current driving speed (of the fleet) and communicates the estimated stopping distance with other vehicles in the fleet (FIG. 4B).

A leading vehicle (LV) of the fleet receives estimated stopping distance from each of the other vehicles in the fleet, compares the received stopping distance with its own stopping distance. Referring to FIG. 4C, when there is a following vehicle (FV1, FV3) that has an estimated braking distance (50 m, 40 m) greater than that of the leading vehicle (30 m), the leading vehicle restricts itself not to make its own full braking. In embodiments, the leading vehicle updates its restricted braking distance to the longest (50 m) among the estimated braking distances of the following vehicles. Subsequently, while driving in a fleet, when an obstacle appears at a distance (40 m) ahead between the leading vehicle's own braking distance (30 m) and the restricted braking distance (50 m) as in FIG. 1, the leading vehicle use the restricted braking distance (50 m) for automated emergency braking rather than the leading vehicle's own braking distance (30 m) such that the leading vehicle collides with the obstacle (FIG. 4D) and allows the following vehicle (FV1) to make a stop without colliding with the leading vehicle. In contrast, when driving alone (not in a fleet), in response to the same obstacle 40 m ahead, the leading vehicle uses its own braking distance 30 m to make an emergency stop to avoid a collision with the obstacle. Hereinafter, embodiments of the present disclosure will be described in detail with reference to FIGS. 3 to 6.

Figure 3:
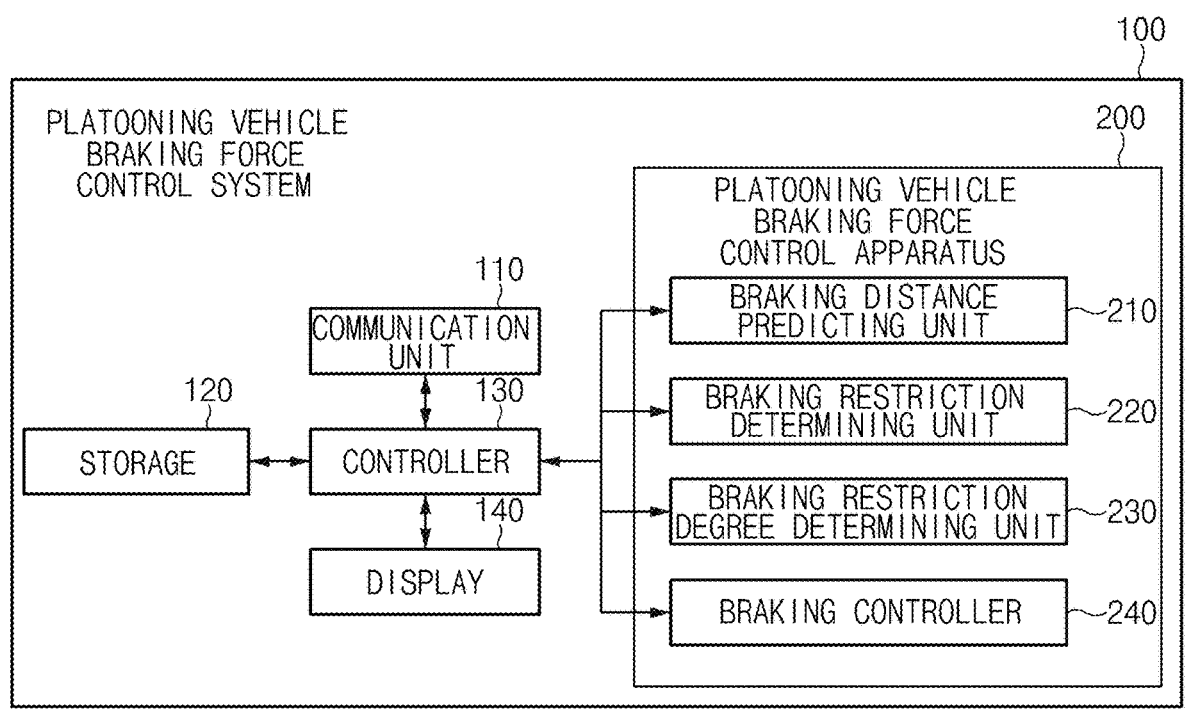
FIG. 3 is a block diagram of a system for controlling a braking force of a platooning vehicle according to an embodiment of the present disclosure.
Figure 4C:
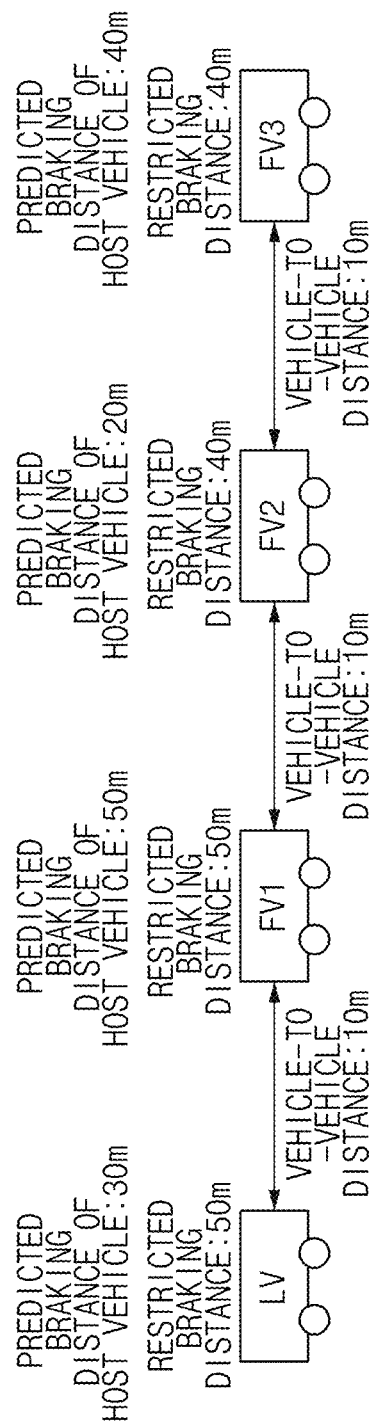
FIG. 4C is an exemplary view of calculating restricted braking distances of platooning vehicles according to an embodiment of the present disclosure.

FIG. 3 is a block diagram of a system for controlling a braking force of a platooning vehicle according to an embodiment of the present disclosure. Then, the platooning vehicle braking force control system 100 may be mounted in all platooning vehicles, and the platooning vehicle braking force control system of a leading vehicle LV and the platooning vehicle braking force control system of following vehicles FV1, FV2, and FV3 may perform communication with each other to share predicted braking distances of the vehicles.

The platooning vehicle braking force control system according to an embodiment of the present disclosure includes a communication unit 110, a storage 120, a controller 130, a display 140, and a platooning vehicle braking force control apparatus 200.

The communication unit 110 performs vehicle-to-vehicle (V2V) communication, vehicle-to-infrastructure (V2I) communication, and the like.

The storage 120 stores information that is transmitted and received through vehicle-to-vehicle communication, and stores a predicted braking distance and a restricted braking distance, which are calculated. The storage 120 may include a memory, such as a flash memory type, a hard disk type, a micro type, or a card type (for example, a secure digital (SD) card or an eXtreme digital (XD) card), and a storage medium of at least one of memories, such as a random access memory (RAM), a static RAM (SRM), a read-only memory (ROM), a programmable ROM (PROM), an electrically erasable PROM (EEPROM), a magnetic RAM (MRAM), a magnetic disk, and an optical disk.

The controller 130 controls operations of elements of the platooning vehicle braking force control system 100. Further, the controller 130 may be realized by an engine control unit (ECU) that is a device in the vehicle.

The display 140 displays whether a braking distance of the vehicle is to be restricted or a restricted braking distance such that the driver may identify the restricted braking distance. Further, the display 140 may display a braking force restriction degree of the vehicle, and may display a ratio of a restricted braking force to an existing braking force to allow the driver to easily recognize the restricted braking force.

Then, although FIG. 1 illustrates a configuration in which the display 140 is included in the platooning vehicle braking force control system 100, the present disclosure is not limited thereto, but a restricted braking distance may be displayed through another device in the vehicle, a cluster, a head-up display, a navigation terminal, an audio, video, navigation (AVN) device. To achieve this, the display 140 may include at least one of a liquid crystal display (LCD), a thin film transistor (TFT) LCD, a light emitting diode (LED), an organic LED, an active matrix OLED (AMO-LED), a flexible display, a bended display, and a 3D display. Among them, some displays may be realized by transparent displays that are configured in a transparent or light-transmitting way such that the outside is visible. Further, the display 140 may be provided as a touchscreen including a touch panel to be used as an input device as well as an output device.

The platooning vehicle braking force control apparatus 200 predicts a predicted braking distance of a platooning host vehicle, determines whether the braking distance of the host vehicle is to be restricted by comparing the predicted braking distance of the host vehicle and the predicted braking distances of the following vehicles, and restricts the braking distance of the host vehicle according to the determination result.

To achieve this, the platooning vehicle braking force control apparatus 200 includes a braking distance predicting unit 210, a braking restriction determining unit 220, a braking restriction degree determining unit 230, and a braking control unit 240.

The braking distance predicting unit 210 predicts a predicted braking distance of the host vehicle. Then, the predicted braking distance refers to a distance that is taken from a braking start time point to a time point at which the braking is completed during the braking of the vehicle. For example, the braking distance of 50 m means that a distance by which the vehicle travels from a time point at which a brake pedal is trodden to decelerate the vehicle as the driver requests braking to a time point at which the vehicle is completely braked and is stopped.

The braking distance predicting unit 210 may calculate a predicted braking distance by using the speed, the frictional coefficient, the gravitational acceleration, the weight, and a total measured braking force of the vehicle during the braking of the vehicle, and a braking distance prediction equation is as in Equation 1.

$$S = \frac{V^2}{2\mu g} \times \frac{W}{F} \quad \text{[Equation 1]}$$

Here, S is a predicted braking distance, V is a speed (m/s) of the vehicle during braking, and μ is a frictional coefficient, and frictional coefficients for road states obtained by using roads and weather information are applied. Further, g is a gravitational acceleration and is 9.8 m/s², and W is the weight of the vehicle and may be acquired by a general vehicle weight predicting system. Further, F is a total measured braking force (kg) of the vehicle, and is a braking force measured periodically.

The braking restriction determining unit 220 may determine whether the braking distance of the host vehicle is to be restricted by comparing the predicted braking distance of the host vehicle and the predicted braking distances of the following vehicles. Then, the braking restriction determining unit 220 determines a location of the platooning host vehicle, and compares a maximum value of the predicted braking distances of the following vehicles and the predicted braking distance of the host vehicle with reference to the host vehicle. Then, the location of the host vehicle may include a sequence in the platoon as well as the current geographical location.

The braking restriction determining unit 220 determines whether the braking distance of the following vehicle is larger than the predicted braking distance of the host vehicle, and determines a maximum braking distance of the following vehicle as a braking distance of the host vehicle when the predicted braking distance of the following vehicle is larger than the predicted braking distance of the host vehicle. Meanwhile, the braking restriction determining unit 220 determines that the predicted braking distance of the host vehicle is to be maintained when the braking distance of the following vehicle is smaller than or equal to the predicted braking distance of the host vehicle.

The braking restriction degree determining unit 230 restricts a braking request degree of the host vehicle to a specific ratio based on the ratio of the maximum value of the predicted braking distances of the following vehicles and the predicted braking distance of the host vehicle.

The braking restriction degree determining unit 230 may determine a braking restriction degree such that a value obtained by multiplying a braking distance of the host vehicle, a value obtained by dividing a total braking force of the host vehicle by the weight of the host vehicle, and a value obtained by dividing the weight of the following vehicle by a total braking force of the following vehicle.

For example, it is assumed that Equation 2 represents a predicted braking distance of vehicle 1 and Equation 3 represents a predicted braking distance of vehicle 2 that is a following vehicle of vehicle 1.

$$S_1 = \frac{V^2}{2\mu g} * \frac{W_1}{F_1} \quad \text{[Equation 2]}$$

$$S_2 = \frac{V^2}{2\mu g} * \frac{W_2}{F_2} \quad \text{[Equation 3]}$$

Then, it is assumed that the speeds V, the frictional coefficients μ, the gravitational accelerations g of vehicle 1 and vehicle 1 are the same when vehicle 1 and vehicle 2 are braked. Accordingly, only the weights W and the measured braking values F of vehicle 1 and vehicle 2 have to be considered to compare the vehicle braking distances of vehicle 1 and vehicle 2.

Accordingly, a proportion equation of a predicted braking distance S1 of vehicle 1 and a predicted braking distance S2 of vehicle 2 may be derived as in Equation 4.

$$\frac{V^2}{2\mu g} = \frac{F_1}{W_1} \times S_1 / \frac{V^2}{2\mu g} = \frac{F_2}{W_2} \times S_2 \quad \text{[Equation 4]}$$

$$\frac{F_1}{W_1} \times S_1 = \frac{F_2}{W_2} \times S_2$$

$$S_2 = S_1 \times \frac{F_1}{W_1} \times \frac{F_2}{W_2}$$

In order to restrict the predicted braking distance S1 of vehicle 1 by the predicted braking distance S2 of vehicle 2, the platooning vehicle braking force control apparatus 200 restricts the predicted braking distance S1 at a ratio of $$\frac{F_1}{W_1} \times \frac{F_2}{W_2}.$$

The braking restriction degree determined by the braking restriction degree determining unit 230 adjusts a braking distance of the host vehicle based on the determined braking restriction degree.

The braking control unit 240 adjusts a braking distance of the host vehicle based on the braking restriction degree.

Figure 4D:
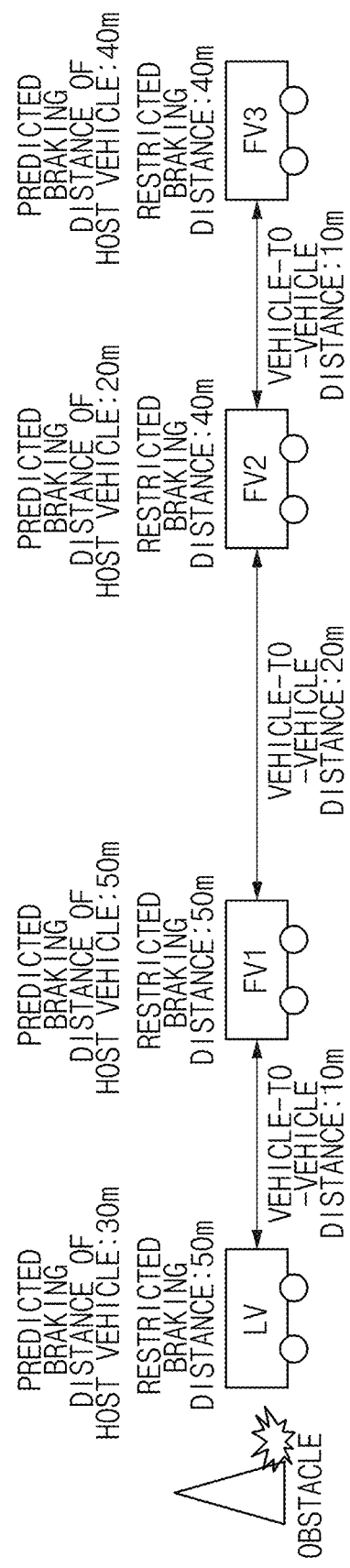
FIG. 4D is an exemplary view of an inter-vehicle distance when a front obstacle is discovered and vehicles are emergently braked after restricted braking distances are applied according to an embodiment of the present disclosure.

A braking distance, an inter-vehicle distance, and a restricted braking distance will be described as an example with reference to FIGS. 4A to 4D. FIG. 4A is an exemplary view of vehicles that platoon while maintaining a specific inter-vehicle distance according to an embodiment of the present disclosure. FIG. 4B is an exemplary view of sharing a predicted braking distance of a host vehicle in platooning vehicles according to an embodiment of the present disclosure. FIG. 4C is an exemplary view of calculating restricted braking distances of platooning vehicles according to an embodiment of the present disclosure. FIG. 4D is an exemplary view of an inter-vehicle distance when a front obstacle is discovered and vehicles are emergently braked after restricted braking distances are applied according to an embodiment of the present disclosure.

As illustrated in FIG. 4A, it is assumed that a total of four vehicles travel while foaming a platoon. The braking force control apparatuses of the platooning vehicles calculate a predicted braking distance of the host vehicle in the current state. Then, the vehicles set the inter-vehicle distance to 10 m and maintain the inter-vehicle distance. Further, the predicted braking distance of the leading vehicle LV is 30 m, the predicted braking distance of the first following vehicle FV1 is 50 m, the predicted braking distance of the second following vehicle FV2 is 20 m, and the predicted braking distance of the third following vehicle FV 3 is 40 m.

Subsequently, as illustrated in FIG. 4B, the platooning vehicle braking force control apparatus 200 transmits the predicted braking distance of the host vehicle to another vehicle through vehicle-to-vehicle (V2V) communication, and the platooning vehicle braking force control apparatuses of the other vehicles also transmit the predicted braking distances thereof to other vehicles to share the predicted braking distances between the platooning vehicles.

FIG. 4C illustrates a method of calculating restricted braking distances of vehicles, and because the predicted braking distance of the leading vehicle LV is 30 m and the predicted braking distance of the first following vehicle FV1 of the following vehicles FV1, FV2, and FV3 is longest, the restricted braking distance of the leading vehicle LV is determined to be 50 m that is the predicted braking distance of the first following vehicle FV1.

The predicted braking distance of the first following vehicle FV1 is 50 m, and the predicted braking distance of the third following vehicle FV3 of the following vehicles FV2 and FV3 is 40 m that is a largest value. Then, because the predicted braking distance of the first following vehicle FV1 is 50 m and the predicted braking distance of the third following vehicle FV3 is 40 m, in which case the predicted braking distance of the first following vehicle FV1 is longer, the predicted braking distance of the first following vehicle FV1 of 50 m is maintained.

Further, because the predicted braking distance of the second following vehicle FV2 is 20 m and the predicted braking distance of the third following vehicle FV3 is 40 m, in which case the predicted braking distance of the second following vehicle FV2 is shorter than the predicted braking distance of the third following vehicle FV3, the second following vehicle FV2 determines the predicted braking distance 40 m of the following vehicle FV3 as the restricted braking distance of the second following vehicle FV2.

Because the third following vehicle FV3 is a rearmost vehicle, no vehicle is present on the rear side of the third following vehicle FV3. Accordingly, the third following vehicle FV3 determines the predicted braking distance of the third following vehicle FV3 as a restricted braking distance.

Referring to FIG. 4D, the following vehicles FV1, FV2, and FV3 are urgently braked when an obstacle is discovered on the front side of the leading vehicle LV in a state in which the restricted braking distance of the leading vehicle LV is 50 m, the restricted braking distance of the second following vehicle FV2 is 40 m, and the restricted braking distance of the third following vehicle FV3 is 40 m, and collision of the platooning vehicles may be minimized by properly maintaining the inter-vehicle distances even though the platooning vehicles are braked in a state in which the braking distances of the vehicles are restricted.

Figure 5:
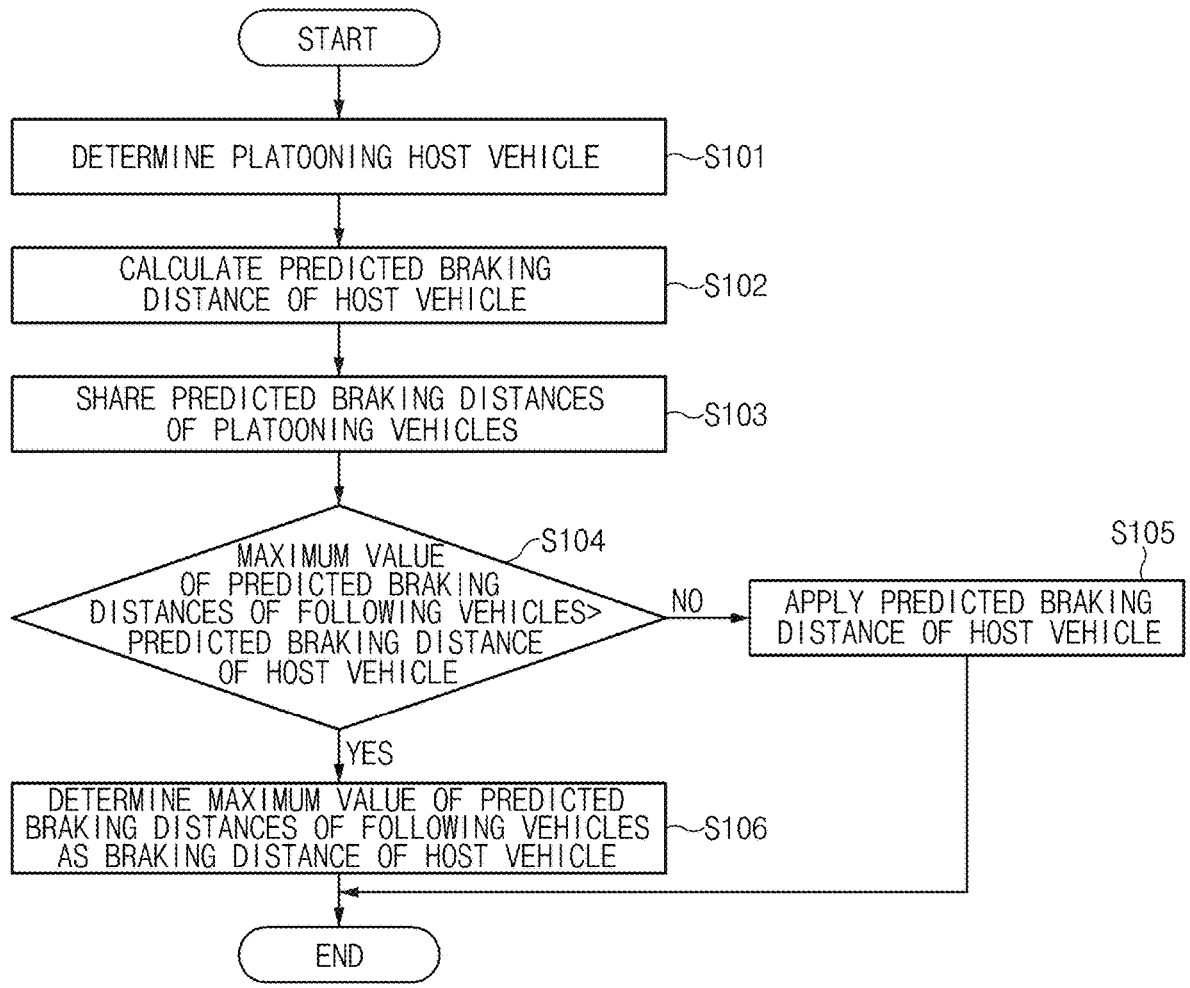
FIG. 5 is a flowchart illustrating a method of controlling a braking force of a platooning vehicle according to an embodiment of the present disclosure.

Hereinafter, a method for controlling a braking force of a platooning vehicle according to an embodiment of the present disclosure will be described with reference to FIG. 5. FIG. 5 is a flowchart illustrating a method of controlling a braking force of a platooning vehicle according to an embodiment of the present disclosure.

The platooning vehicle braking force control system 100 determines a location of a platooning host vehicle (S101), and calculates a predicted braking distance of the host vehicle by using the speed, the frictional coefficient, the gravitational acceleration, the weight, and a measured total braking force of the host vehicle with reference to the host vehicle (S102).

Next, the platooning vehicle braking force control system 100 transmits the predicted braking distance of the platooning vehicle and receives predicted braking distances of the other vehicles from the other vehicles to share the predicted braking distances of the platooning vehicles (S103).

The platooning vehicle braking control system 100 compares a maximum value of the predicted braking distances of the following vehicles with the predicted braking distance of the host vehicle (S104), and determines the predicted braking distance of the host vehicle as a braking distance of the host vehicle if the maximum value is smaller than or equal to the predicted braking distance of the host vehicle (S105). That is, it means that the following vehicle may cope with urgent braking of the host vehicle because the braking force of the following vehicle is better than the braking force of the host vehicle if the predicted braking distance of the following vehicle is shorter than the predicted braking distance of the host vehicle.

Meanwhile, if the maximum value of the predicted braking distances of the following vehicles is larger than the predicted braking distance of the host vehicle, the maximum value is determined as a braking distance of the host vehicle (S106). That is, collision with a following vehicle, of which the braking force is weak, may be prevented by applying the braking distance of the host vehicle as the braking distance of the following vehicle if the predicted braking distance of the following vehicle is larger than the predicted braking distance of the host vehicle.

In this way, the braking distances of the platooning vehicles, which have different predicted braking distances according to the weight, the model, and the braking performance thereof, may be differently set for the platooning vehicles according to the braking forces so that collision of the vehicles may be prevented, by allowing the vehicles to share the predicted braking distances of the vehicles and by comparing the predicted braking distance of the host vehicle and the predicted braking distances of the following vehicles to control the braking distance of the host vehicle according to the comparison result.

Further, in the case in which the braking distance of the platooning vehicles are restricted to be differently set according to the braking forces thereof, information on the restricted braking force is displayed to the driver so that the driver may predict a change of the performance of the brake and may be helped to drive the vehicle more carefully.

Figure 6:
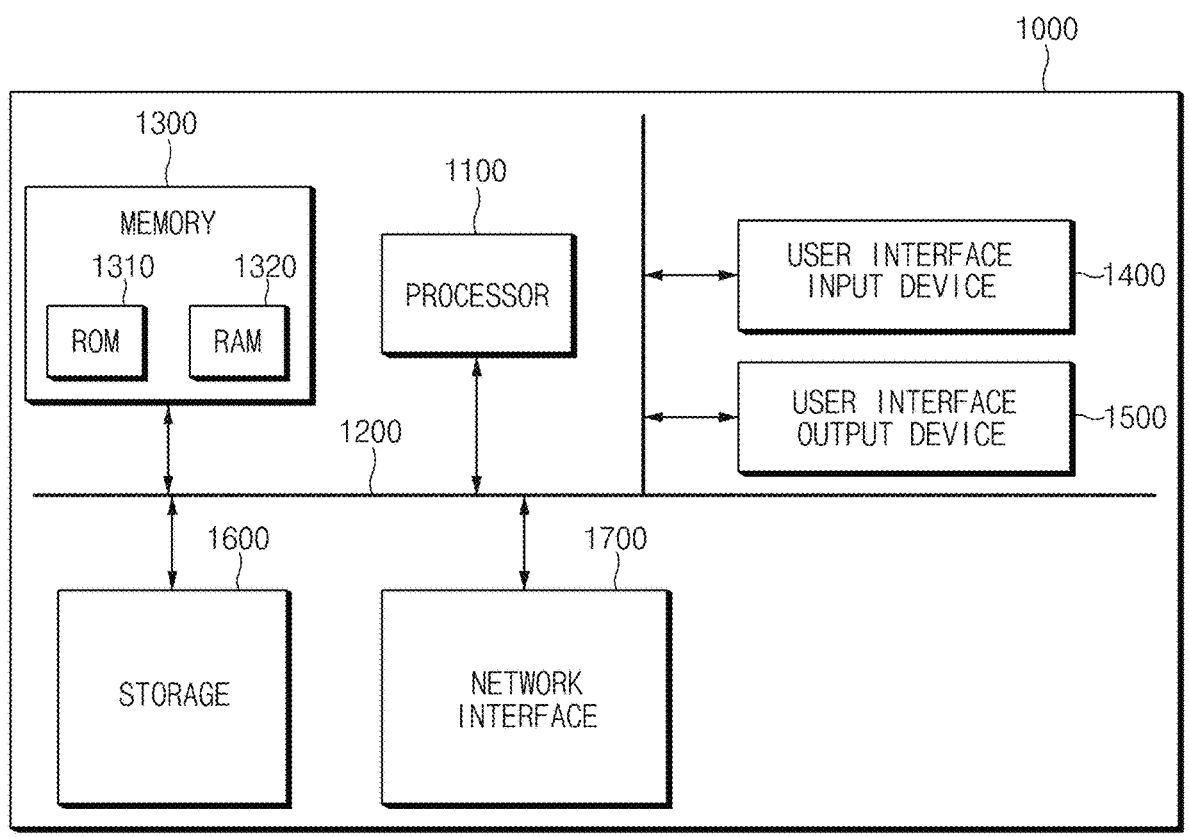
FIG. 6 is a diagram of a computer system to which the method for controlling a braking force of a platooning vehicle according to an embodiment of the present disclosure is applied.

FIG. 6 is a diagram of a computer system to which the method for controlling a braking force of a platooning vehicle according to an embodiment of the present disclosure is applied. Referring to FIG. 6, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to certain embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The present technology may prevent collision of the platooning vehicles by restraining the braking forces of the vehicles in consideration of the predicted braking distances of all the vehicles.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling a braking force of a platooning vehicle, the apparatus comprising:
    a braking distance predicting unit configured to predict a predicted braking distance of a host vehicle;
    a braking restriction determining unit configured to determine whether the predicted braking distance of the host vehicle is to be restricted, by comparing the predicted braking distance of the host vehicle with predicted braking distances of following vehicles shared from the following vehicles; and
    a braking restriction degree determining unit configured to determine a braking restriction degree of the predicted braking distance of the host vehicle in the case in which it is necessary to restrict the predicted braking distance of the host vehicle,
    wherein the braking restriction degree determining unit is configured to determine the braking restriction degree such that a value obtained by multiplying a braking distance of the host vehicle, a value obtained by dividing a total braking force of the host vehicle measured periodically by a weight of the host vehicle, and a value obtained by dividing a weight of the following vehicle by a total braking force of the following vehicle is equal to the predicted braking distance of the following vehicle.

2. The apparatus of claim 1, wherein the braking distance predicting unit calculates the predicted braking distance of the host vehicle by using a speed, a frictional coefficient, a gravitational acceleration, a weight, and a measured total braking force of the host vehicle during braking of the host vehicle.

3. The apparatus of claim 1, wherein the braking restriction determining unit compares the predicted braking distance of the host vehicle with a maximum value of the predicted braking distances of the following vehicles.

4. The apparatus of claim 3, wherein the braking restriction determining unit determines a location of the host vehicle in a platoon, and compares the maximum value of the predicted braking distances of the following vehicles with the predicted braking distance of the host vehicle with reference to the determined location of the host vehicle.

5. The apparatus of claim 1, wherein the braking restriction determining unit determines whether the predicted braking distance of the following vehicles are larger than the predicted braking distance of the host vehicle, and determines that it is necessary to restrict the predicted braking distance of the host vehicle to a maximum braking distance of the following vehicle in the case in which the braking distance of the following vehicle is larger than the predicted braking distance of the host vehicle.

6. The apparatus of claim 5, wherein the braking restriction determining unit determines that the predicted braking distance of the host vehicle is to be maintained in the case in which the predicted braking distance of the following vehicle is smaller than or equal to the predicted braking distance of the host vehicle.

7. The apparatus of claim 1, wherein the braking restriction degree determining unit restricts a braking request degree of the host vehicle to a specific ratio based on a ratio of a maximum value of the predicted braking distances of the following vehicles to the predicted braking distance of the host vehicle.

8. A system for controlling a braking force of a platooning vehicle, the system comprising:
    a communication unit configured to perform communication between platooning vehicles;
    a platooning vehicle braking force control apparatus configured to predict a predicted braking distance of a host vehicle in a platoon, determine whether the predicted braking distance of the host vehicle is to be restricted by comparing the predicted braking distance of the host vehicle with predicted braking distances of following vehicles; and
    a display configured to display a braking force restriction result of the host vehicle in the platoon,
    wherein the platooning vehicle braking force control apparatus is configured to determine a braking restriction degree such that a value obtained by multiplying a braking distance of the host vehicle, a value obtained by dividing a total braking force of the host vehicle measured periodically by a weight of the host vehicle, and a value obtained by dividing a weight of the following vehicle by a total braking force of the following vehicle is equal to the predicted braking distance of the following vehicle.

9. The system of claim 8, wherein a display unit displays a ratio of a restricted braking force to an existing braking force.

10. The system of claim 8, wherein the platooning vehicle braking force control apparatus includes:
    a braking distance predicting unit configured to predict the predicted braking distance of the host vehicle;

a braking restriction determining unit configured to determine whether the predicted braking distance of the host vehicle is to be restricted, by comparing the predicted braking distance of the host vehicle with the predicted braking distances of following vehicles; and a braking restriction degree determining unit configured to determine a braking restriction degree of the predicted braking distance of the host vehicle in the case in which it is necessary to restrict the predicted braking distance of the host vehicle.

11. The system of claim 10, wherein the braking distance predicting unit calculates the predicted braking distance of the host vehicle by using a speed, a frictional coefficient, a gravitational acceleration, a weight, and a measured total braking force of the host vehicle during braking of the host vehicle.

12. The system of claim 10, wherein the braking restriction determining unit compares the predicted braking distance of the host vehicle with a maximum value of the predicted braking distances of the following vehicles.

13. The system of claim 10, wherein the braking restriction determining unit determines whether the predicted braking distance of the following vehicle are larger than the predicted braking distance of the host vehicle, and determines that it is necessary to restrict the predicted braking distance of the host vehicle to a maximum braking distance of the following vehicle in the case in which the predicted braking distance of the following vehicle is larger than the predicted braking distance of the host vehicle.

14. The system of claim 13, wherein the braking restriction determining unit determines that the predicted braking distance of the host vehicle is to be maintained in the case in which the predicted braking distance of the following vehicle is smaller than or equal to the predicted braking distance of the host vehicle.

15. The system of claim 10, wherein the braking restriction degree determining unit restricts a braking request degree of the host vehicle to a specific ratio based on a ratio of a maximum value of the predicted braking distances of the following vehicles to the predicted braking distance of the host vehicle.

16. A method for controlling a braking force of a platooning vehicle, the method comprising:

predicting a predicted braking distance of a host vehicle;

determining whether the predicted braking distance of the host vehicle is to be restricted, by comparing the predicted braking distance of the host vehicle with a maximum value of predicted braking distances of following vehicles;

in the case in which it is necessary to restrict the predicted braking distance of the host vehicle, determining a braking restriction degree of the braking distance; and braking the host vehicle by applying the braking restriction degree, wherein the step of determining whether the predicted braking distance of the host vehicle determines the braking restriction degree such that a value obtained by multiplying a braking distance of the host vehicle, a value obtained by dividing a total braking force of the host vehicle measured periodically by a weight of the host vehicle, and a value obtained by dividing a weight of the following vehicle by a total braking force of the following vehicle is equal to the predicted braking distance of the following vehicle.

17. The method of claim 16, further comprising:

displaying a braking force restriction result of the host vehicle in a platoon.

* * * * *